US012673422B2

(12) United States Patent
Hwang et al.

(10) Patent No.: US 12,673,422 B2
(45) Date of Patent: Jul. 7, 2026

(54) SYSTEMS AND METHODS FOR MANUFACTURING WITH AN END EFFECTOR HAVING TWO OR MORE INDEPENDENT TOOLS

(71) Applicant: GM GLOBAL TECHNOLOGY OPERATIONS LLC, Detroit, MI (US)

(72) Inventors: Dooil Hwang, Rochester Hills, MI (US); Terebara Hughes, Warren, MI (US); Thiagarajan Chidambareswaran, Sterling Heights, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 11 days.

(21) Appl. No.: 18/795,786

(22) Filed: Aug. 6, 2024

(65) Prior Publication Data

US 2026/0042207 A1     Feb. 12, 2026

(51) Int. Cl.
| | |
|---|---|
| *B25J 9/16* | (2006.01) |
| *B25J 11/00* | (2006.01) |
| *B25J 15/00* | (2006.01) |

(52) U.S. Cl.
CPC ......... B25J 9/1664 (2013.01); B25J 15/0019 (2013.01); *B25J 11/005* (2013.01)

(58) Field of Classification Search
CPC ..... B25J 9/1664; B25J 15/0019; B25J 11/005
See application file for complete search history.

(56) References Cited

U.S. PATENT DOCUMENTS

| | | | | |
|---|---|---|---|---|
| 11,230,000 B2 * | 1/2022 | Kemp | .................... | B25J 11/008 |
| 12,430,792 B1 * | 9/2025 | Garaas | .................... | B25J 9/1697 |
| 12,496,147 B2 * | 12/2025 | Truckai | .................. | A61B 34/30 |
| 12,508,665 B2 * | 12/2025 | Ott | ........................... | B23K 9/12 |
| 12,508,711 B2 * | 12/2025 | Kravchenko | .......... | B25J 9/1674 |
| 2008/0247844 A1 * | 10/2008 | Hartrampf | .............. | B21J 15/32 |
| | | | | 901/30 |

(Continued)

FOREIGN PATENT DOCUMENTS

| | | |
|---|---|---|
| DE | 102014015364 A1 | 4/2015 |
| DE | 102017206142 A1 | 10/2018 |

(Continued)

*Primary Examiner* — Sohana Tanju Khayer
(74) *Attorney, Agent, or Firm* — Ingrassia Fisher & Lorenz, LLP | IF&L

(57)          ABSTRACT

Systems and methods are provided for manufacturing with an end effector. The end effector includes a coupling device configured to be functionally coupled to a robotic arm of an articulating robot, first and second tool arms coupled to and extending from the coupling device, each of the first and second tool arms configured to independently and controllably extend and retract from the coupling device and configured to controllably rotate relative to the coupling device, a first tool functionally coupled to the first tool arm and configured to independently perform a first manufacturing task, the first tool configured to controllably rotate relative to the first tool arm, and a second tool functionally coupled to the second tool arm and configured to independently perform a second manufacturing task, the second tool configured to controllably rotate relative to the second tool arm.

20 Claims, 6 Drawing Sheets

(56) References Cited

U.S. PATENT DOCUMENTS

| | | | |
|---|---|---|---|
| 2015/0007681 A1* | 1/2015 | Murakami | B25J 19/0025 |
| | | | 901/27 |
| 2020/0030979 A1* | 1/2020 | Bank | B25J 13/08 |
| 2020/0055195 A1* | 2/2020 | Ignakov | B25J 13/06 |
| 2021/0146532 A1* | 5/2021 | Rodriguez Garcia | |
| | | | B25J 9/0087 |
| 2021/0178583 A1* | 6/2021 | Ye | G06T 7/60 |
| 2021/0378752 A1* | 12/2021 | Paul | G06N 20/00 |
| 2022/0104878 A1* | 4/2022 | Weiss | G16H 20/40 |
| 2022/0226056 A1* | 7/2022 | Beckman | A61B 34/71 |
| 2023/0286140 A1* | 9/2023 | Usui | B25J 19/023 |
| 2023/0330764 A1* | 10/2023 | Ott | B23K 9/126 |
| 2023/0405819 A1* | 12/2023 | Kravchenko | B25J 19/023 |
| 2023/0405822 A1* | 12/2023 | Kravchenko | B25J 9/1674 |
| 2024/0009856 A1* | 1/2024 | Brand | H01L 21/67724 |
| 2024/0164858 A1* | 5/2024 | Hoelzle | A61B 34/75 |
| 2024/0269864 A1* | 8/2024 | Hwang | B25J 9/1612 |
| 2024/0342905 A1* | 10/2024 | Doi | B25J 9/1653 |
| 2024/0398492 A1* | 12/2024 | Webster-Smith | A61B 34/30 |
| 2025/0123623 A1* | 4/2025 | Jinandra | G05D 1/667 |

FOREIGN PATENT DOCUMENTS

| | | | |
|---|---|---|---|
| DE | 102018103805 B4 | 8/2021 |
| EP | 0139857 A1 | 5/1985 |
| EP | 1839820 A1 | 10/2007 |
| WO | 2020038419 A1 | 2/2020 |

* cited by examiner

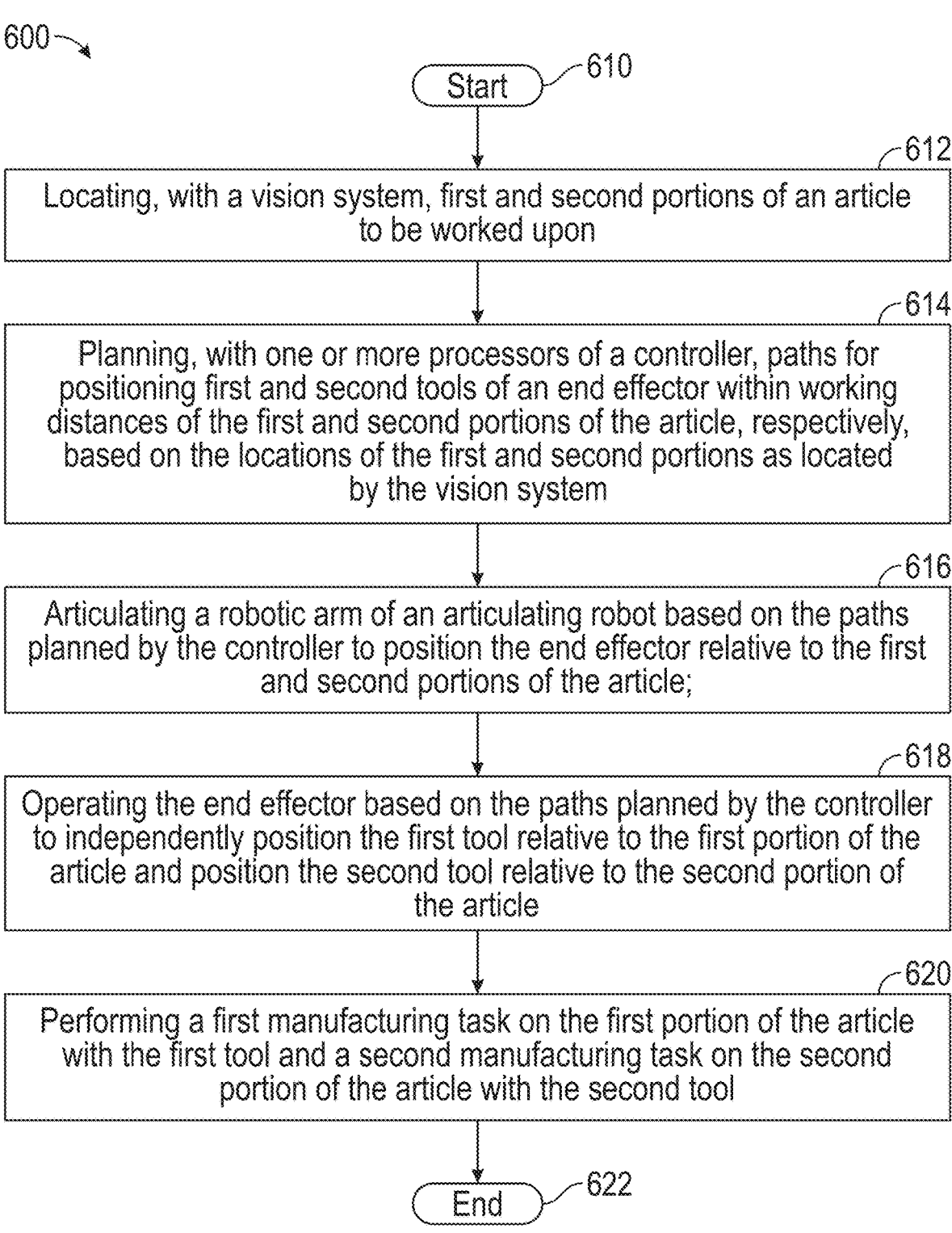

600

Start — 610

612
Locating, with a vision system, first and second portions of an article to be worked upon 614
Planning, with one or more processors of a controller, paths for positioning first and second tools of an end effector within working distances of the first and second portions of the article, respectively, based on the locations of the first and second portions as located by the vision system 616
Articulating a robotic arm of an articulating robot based on the paths planned by the controller to position the end effector relative to the first and second portions of the article;

618
Operating the end effector based on the paths planned by the controller to independently position the first tool relative to the first portion of the article and position the second tool relative to the second portion of the article 620
Performing a first manufacturing task on the first portion of the article with the first tool and a second manufacturing task on the second portion of the article with the second tool End — 622

FIG. 6

SYSTEMS AND METHODS FOR MANUFACTURING WITH AN END EFFECTOR HAVING TWO OR MORE INDEPENDENT TOOLS

INTRODUCTION

The technical field generally relates to automated manufacturing, and more particularly relates to a multipurpose end effector capable of performing multiple tasks simultaneously.

Various manufacturing tasks can be automated to enhance productivity, precision, and quality. For instance, certain automobile assembly tasks can be performed using articulating robots and vision systems. These robots can handle operations such as welding, screwing, and assembling components. Vision systems utilize cameras or other devices to identify and locate parts, directing the robots to accurately pick, place, and assemble components.

Due to the numerous advantages of manufacturing automation, there is an ongoing desire for systems and methods capable of further improving manufacturing processes. Furthermore, other desirable features and characteristics of the present disclosure will become apparent from the subsequent detailed description and the appended claims, taken in conjunction with the accompanying drawings and the foregoing introduction.

SUMMARY

An end effector is provided that, in one example, includes a coupling device configured to be functionally coupled to a robotic arm of an articulating robot, first and second tool arms coupled to and extending from the coupling device, each of the first and second tool arms configured to independently and controllably extend and retract from the coupling device and configured to controllably rotate relative to the coupling device, a first tool functionally coupled to the first tool arm and configured to independently perform a first manufacturing task, the first tool configured to controllably rotate relative to the first tool arm, and a second tool functionally coupled to the second tool arm and configured to independently perform a second manufacturing task, the second tool configured to controllably rotate relative to the second tool arm.

In various examples, the first tool of the end effector may be configured to install a fastener in a component and the first manufacturing task includes coupling two components with the fastener. In various examples, the first tool includes a magazine configured to store and individually dispense a plurality of fasteners.

In various examples, the first tool of the end effector may be a welding device, and the first manufacturing task includes welding one or more components.

In various examples, the end effector may include a third tool arm coupled to and extending from the coupling device, the third tool arm configured to independently and controllably extend and retract from the coupling device and configured to controllably rotate relative to the coupling device, and a third tool functionally coupled to the third tool arm and configured to independently perform a third manufacturing task, the third tool configured to controllably rotate relative to the third tool arm. In various examples, two or more of the first manufacturing task, the second manufacturing task, and the third manufacturing task are different types of manufacturing tasks.

In various examples, the end effector may include a first rotary actuator coupling the first tool arm to the coupling device and configured to rotate the first tool arm relative to the coupling device, a second rotary actuator coupling the second tool arm to the coupling device and configured to rotate the second tool arm relative to the coupling device, a first linear actuator configured to extend and retract the first tool arm relative to the coupling device, a second linear actuator configured to extend and retract the second tool arm relative to the coupling device, a third rotary actuator coupling the first tool to the first tool arm and configured to rotate the first tool relative to the first tool arm, and a fourth rotary actuator coupling the second tool to the second tool arm and configured to rotate the second tool relative to the second tool arm.

A system is provided for performing manufacturing tasks on an article. In one example, the system includes a vision system configured to locate first and second portions of the article to be worked upon and generate vision data indicative of the locations of the first and second portions, an articulating robot having a robotic arm functionally coupled to and configured to controllably move an end effector that includes a coupling device coupled to the robotic arm of the articulating robot, first and second tool arms coupled to and extending from the coupling device, a first tool functionally coupled to the first tool arm, and a second tool functionally coupled to the second tool arm, and a controller in operable communication with the vision system and the articulating robot and that is configured to, by one or more processors: receive the vision data from the vision system, plan paths for positioning the first and second tools within working distances of the first and second portions of the article, respectively, based on the locations of the first and second portions in the vision data, articulate the robotic arm of the articulating robot based on the planned paths to position the end effector relative to the first and second portions of the article, operate the end effector based on the planned paths to independently position the first tool relative to the first portion of the article and position the second tool relative to the second portion of the article, and perform a first manufacturing task on the first portion of the article with the first tool and a second manufacturing task on the second portion of the article with the second tool.

In various examples, the first tool of the system may be configured to install a fastener in a component and the first manufacturing task includes coupling two components with the fastener. In various examples, the first tool may include a magazine configured to store and individually dispense a plurality of fasteners.

In various examples, the first tool of the system may be a welding device, and the first manufacturing task includes welding one or more components.

In various examples, the end effector of the system may include one or more additional tool arms each coupled to and extending from the coupling device, the one or more additional tool arms each configured to independently and controllably extend and retract from the coupling device and configured to independently and controllably rotate relative to the coupling device, and one or more additional tools each functionally coupled to a corresponding one of the one or more additional tool arms, each of the one or more additional tools configured to independently perform one or more additional manufacturing tasks, the one or more additional tools each configured to controllably rotate relative to the one or more additional tool arms coupled thereto. In various examples, two or more of the first manufacturing task, the second manufacturing task, and the one or more additional manufacturing tasks may be different types of manufacturing tasks.

A method is provided for performing manufacturing tasks on an article. In one example, the method includes locating, with a vision system, first and second portions of the article to be worked upon, planning, with one or more processors of a controller, paths for positioning first and second tools of an end effector within working distances of the first and second portions of the article, respectively, based on the locations of the first and second portions as located by the vision system, articulating a robotic arm of an articulating robot based on the paths planned by the controller to position the end effector relative to the first and second portions of the article, operating the end effector based on the paths planned by the controller to independently position the first tool relative to the first portion of the article and position the second tool relative to the second portion of the article, and performing a first manufacturing task on the first portion of the article with the first tool and a second manufacturing task on the second portion of the article with the second tool.

In various examples, operating the end effector to position the first and second tools may include independently extending or retracting first and second tool arms of the end effector relative to a coupling device securing the end effector to the robotic arm of the articulating robot, wherein the first tool is coupled to the first tool arm and the second tool is coupled to the second tool arm, independently rotating the first and second tool arms of the end effector relative to the coupling device, and independently rotating the first and second tools relative to the first and second tool arms of the end effector, respectively.

In various examples, the first manufacturing task may include coupling two components together with a fastener using the first tool. In various examples, the method may include dispensing the fastener to the first tool from a magazine configured to store and individually dispense a plurality of fasteners.

In various examples, the first manufacturing task of the method may include welding one or more components.

In various examples, the first manufacturing task and the second manufacturing task of the method may be the same type of manufacturing task.

In various examples, the first manufacturing task and the second manufacturing task of the method may be different types of manufacturing tasks.

BRIEF DESCRIPTION OF THE DRAWINGS

The exemplary embodiments will hereinafter be described in conjunction with the following drawing figures, wherein like numerals denote like elements, and wherein.

4

FIG. 6 is a flowchart illustrating a method of performing a manufacturing task in accordance with an example.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
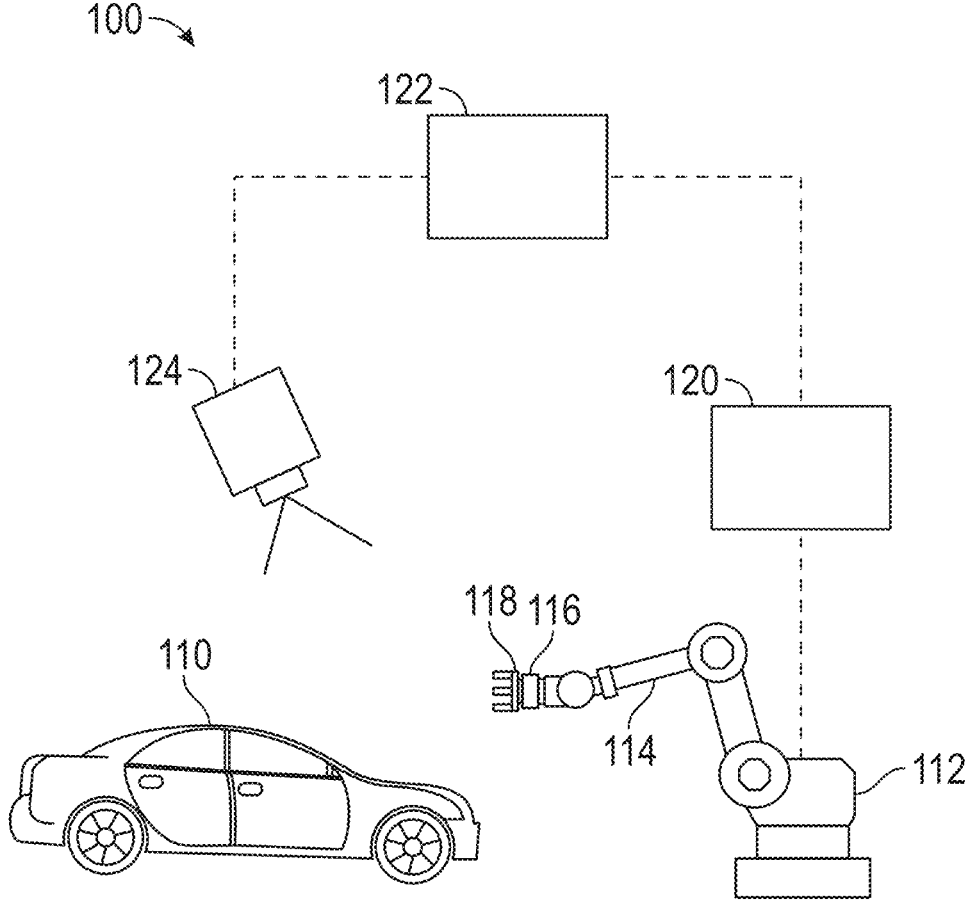
FIG. 1 is a diagram representing a system for performing various tasks during manufacture of a vehicle in accordance with an example.

FIG. 1 illustrates a system 100 for assembly of an article, according to an example. In this example, the article to be worked upon is a partially assembled vehicle 110; however, the system 100 is not limited to any particular application and may be configured for assembly and/or interaction with various other articles. The system 100 includes an articulating robot 112 having a robotic arm 114. A multipurpose end effector 118 is operably coupled to a face plate 116 disposed at an end of the robotic arm 114. The system 100 includes a controller 120 and a vision system 122 that includes one or more vision devices 124.

During assembly of the vehicle 110, the vision system 122 may use the vision device(s) 124 to determine positions or locations of portions of the vehicle 110. This functionality provides the capability to precisely locate portions of the vehicle 110 to be worked upon, such as bolt holes. The controller 120 may receive vision data from the vision system 122 indicative of the locations of the portions of the vehicle 110, and process the vision data in combination with assembly instructions to operate the articulating robot 112 to perform manufacturing tasks on the vehicle 110. For example, the controller 120 may instruct the articulating robot 112 to articulate the robotic arm 114 about various axes to position the end effector 118 relative to the portions of the vehicle 110 to be worked upon that were located by the vision system 122. The end effector 118 may then be operated to assemble or otherwise interact with the vehicle 110 in accordance with the assembly instructions.

In some examples, the controller 120 may include at least one processor, a communication bus, and a computer readable storage device or media. The processor performs the computation and control functions of the controller 120. The processor can be any custom made or commercially available processor, a central processing unit (CPU), a graphics processing unit (GPU), an auxiliary processor among several processors associated with the controller 120, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or nonvolatile memory that may be used to store various operating variables while the processor is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 120 in controlling the articulating robot 112. The bus serves to transmit programs, data, status and other information or signals between the various components of the controller 120 and/or the system 100. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the vision system 122, perform logic, calculations, methods and/or algorithms, and generate data based on the logic, calculations, methods, and/or algorithms. Although only one controller 120 is shown in FIG. 1, examples of the system 100 can include any number of controllers 120 that communicate over any suitable communication medium or a combination of communication mediums and that cooperate to process the sensor signals, perform logic, calculations, methods, and/or algorithms, and generate data.

As can be appreciated, the controller 120 may otherwise differ from the example depicted in FIG. 1. For example, the controller 120 may be coupled to or may otherwise utilize one or more remote computer systems and/or other control systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include recordable media such as hard drives, memory cards and optical disks, and transmission media such as digital and analog communication links. It will be appreciated that cloud-based storage and/or other techniques may also be utilized in certain examples. It will similarly be appreciated that the computer system of the controller 120 may also otherwise differ from the example depicted in FIG. 1, for example in that the computer system of the controller 120 may be coupled to or may otherwise utilize one or more remote computer systems and/or other control systems. In some examples, the controller 120 may be a component of the articulating robot 112.

In some examples, the vision system 122 includes various components configured to sensing aspects of the vehicle 110 and assisting the articulating robot 112 during performance of manufacturing tasks therewith. For example, the vision system 122 may be configured to identify components, locate components or portions thereof, determine spatial relationships between components or portions thereof, etc. In some examples, the vision system 122 may include the vision device(s) 124 for sensing observable conditions of the components of the vehicle 10, and a controller for processing signals received from the vision device(s) 124. The controller may include various components, such as one or more processors and a computer readable storage device or media. In some examples, the vision system 122 may be incorporated into the controller 120. The vision devices 124 may include various types of devices such as, but not limited to, various types of cameras configured for capturing two-dimensional (2D) and/or three-dimensional (3D) images, laser sensors configured for obtaining accurate distance measurements (e.g., for tasks like surface profiling and object detection), and/or infrared sensors for detecting heat signatures (e.g., for identifying defects based on temperature variations). The vision system 122 may receive signals from the vision device(s) 124 and process the signals with the controller using one or more types of software programs. In some examples, the vision system 122 may include an image processing program configured to use one or more techniques for analyzing the signals such as, but not limited to, edge detection, filtering, and segmentation techniques, to extract useful information to assist in the operation of the articulating robot. In some examples, the vision system 122 may include machine learning algorithms and/or artificial intelligence programs configured to, for example, be trained to recognize patterns, detect defects, and/or improve decision-making over time.

The articulating robot 112 may have various structures depending on the specific manufacturing tasks to be performed thereby. In some examples, the articulating robot 112 includes one or more rotary joints that allow for controlled movement of segments of the robotic arm 114 about one or more degrees of freedom. For example, the robotic arm 114 may have three, four, five, six, or more axes.

Referring now to FIGS. 2-5, with continued reference to FIG. 1, an assembly task end effector 200 is provided in accordance with an example. In some examples, the assembly task end effector 200 may be used in the system 100 as the multipurpose end effector 118. The assembly task end effector 200 may include a coupling device 210, two or more tool arms 212 coupled to and extending from the coupling device 210, and tools 214 functionally coupled to each of the tool arms 212.

The coupling device 210 may have various structures configured to be functionally coupled to a robotic arm of an articulating robot. For example, the coupling device 210 may be secured to the face plate 116 of the articulating robot 112. In the example of FIGS. 2-5, the coupling device 210 includes a robot mounting flange 234, a frame support flange 236, and an elongated body 238 extending between and coupling the robot mounting flange 234 and the frame support flange 236. The robot mounting flange 234 is configured to be secured to the robotic arm of an articulating robot. In this example, the robot mounting flange 234 is ring-shaped and includes a plurality of mounting holes configured to receive fasteners therein for securing the robot mounting flange 234 to the robotic arm of the articulating robot. The frame support flange 236 includes protruding portions each configured to support a corresponding one of the tool arms 212. In this example, the frame support flange 236 includes three protruding portions. The elongated body 238 has a cylindrical shape and is sufficiently elongated to provide adequate space for any components of the end effector 200 disposed between the robot mounting flange 234 and the frame support flange 236. It will be understood that the robot mounting flange 234, the frame support flange 236, and the elongated body 238 may have shapes other than those depicted in the figures.

Figure 2:
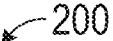
FIG. 2 is a perspective view of an exemplary end effector that may be used with the system of FIG. 1 in accordance with an example.
Figure 3:
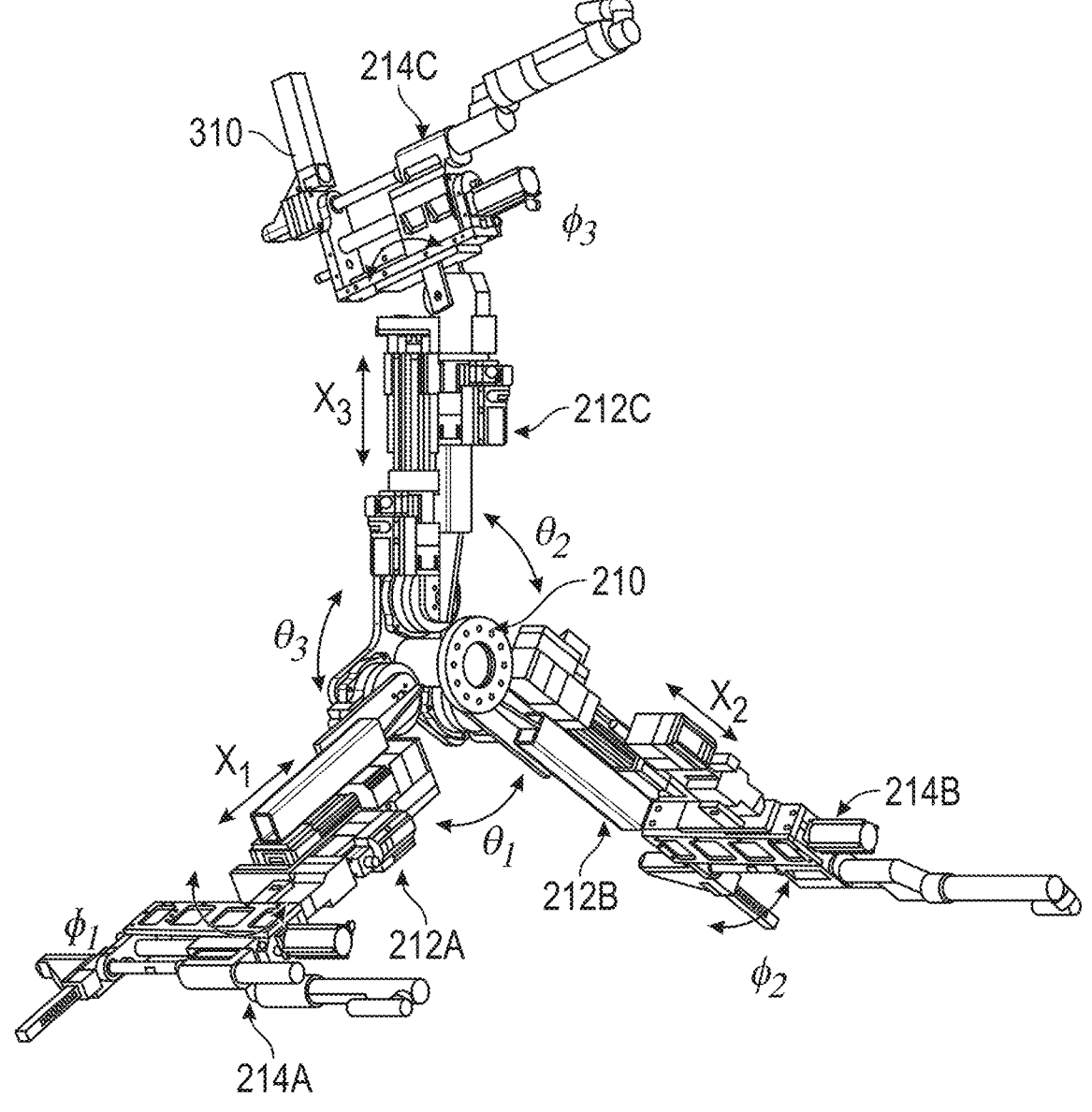
FIG. 3 is a perspective view of the end effector of FIG. 2 illustrating articulation capabilities thereof in accordance with an example.

The tool arms 212 may have various structures configured to be secured to the coupling device 210, extend and retract from the coupling device, and support the tools 214. In various examples, the tool arms 212 may have the same or different structures from each other. In the example of FIG. 2, the tool arms 212 each include a frame 218 secured at an end thereof to a corresponding one of the protruding portions of the frame support flange 236 via frame rotary actuators 216 disposed between each of the frames 218 and the frame support flange 236. The frame rotary actuators 216 are configured to controllably rotate the tool arms 212 relative to the coupling device 210 at pivot points defined by connections between the frames 218 and the protruding portions of the frame support flange 236. For example, FIG. 3 depicts frame articulation paths ($\theta_1$, $\theta_2$, and $\theta_3$) along which the frames 218 may be rotated with the frame rotary actuators 216. Specifically, a first tool arm 212A may be rotated along a first frame articulation path $\theta_1$ and a third frame articulation path $\theta_3$, a second tool arm 212B may be rotated along the first frame articulation path $\theta_1$ and a second frame articulation path $\theta_2$, and a third tool arm 212C may be rotated along the second frame articulation path $\theta_2$ and the third frame articulation path $\theta_3$.

Each of the frames 218 are secured to a linear movement assembly 222 that includes an assembly bracket 240 that is fixed to the frame 218, fixed to a linear actuator 220 via rods 244, and slidably coupled to guide rails 242. The distal ends of the guide rails 242 are fixed to a mounting plate 224. The linear actuator 220 is directly coupled to the mounting plate 224 with a telescoping spindle 246. Operation of the linear actuator 220 causes extension and retraction of the telescoping spindle 246 and thereby linearly moves the mounting plate 224 relative to the frame 218. For example, FIG. 3 depicts frame linear paths ($x_1$, $x_2$, and $x_3$) along which the mounting plates 224 may be moved with the linear actuators 220. Specifically, the first tool arm 212A may be extended and retracted along a first frame linear path $x_1$, the second tool arm 212B may be extended and retracted along a second frame linear path $x_2$, and the third tool arm 212C may be extended and retracted along a third frame linear path $x_3$.

Each of the mounting plates 224 are secured to mounting plates 228 of the tools 214 by tool rotary actuators 226. The tool rotary actuators 226 are operable to rotate the mounting plates 228, and therefore the tools 214, about an axis perpendicular to the direction of linear movement of the tool arms 212. For example, FIG. 3 depicts tool articulation paths ($\phi_1$, $\phi_2$, and $\phi_3$) along which the corresponding tools 214 may be rotated the tool rotary actuators 226. Specifically, a first tool 214A may be rotated along a first tool articulation path $\phi_1$, the second tool 214B may be rotated along a second tool articulation path $\phi_2$, and the third tool 214C may be rotated along a third tool articulation path $\phi_3$.

The tools 214 are each configured to independently perform one or more manufacturing tasks. The tools 214 are not limited to any particular type of manufacturing task, and each of the tools 214 may be configured to perform the same type of manufacturing task or different types of manufacturing tasks. As examples, each of the tools 214 may be configured to insert fasteners (e.g., bolts, screws, rivets, etc.), deposit materials (e.g., adhesives, coatings, etc.), or perform a welding operation on one or more components of the vehicle 110.

Figure 4:
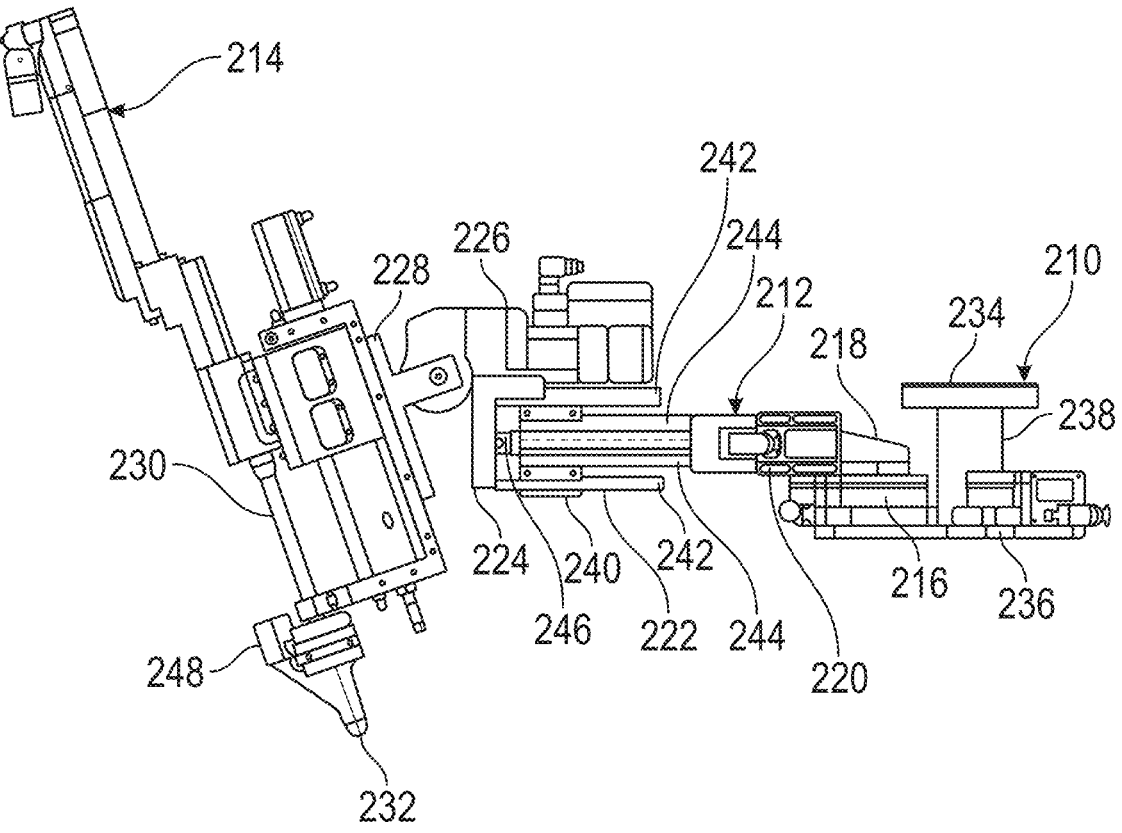
FIG. 4 is a side view of an exemplary robotic arm and tool of the end effector of FIGS. 2-3 in accordance with an example.

In the examples of FIGS. 2-4, each of the tools 214 are configured to insert bolts into corresponding bolt holes of the vehicle 110. Specifically, a working tip 232 may be positioned over a bolt hole of the vehicle 110 and then a spindle 230 may be operated to rotate and push a bolt from the working tip 232 such that the bolt is threadedly secured within the bolt hole. In this example, the tools 214 are configured to receive bolts from a magazine 310.

Figure 5:
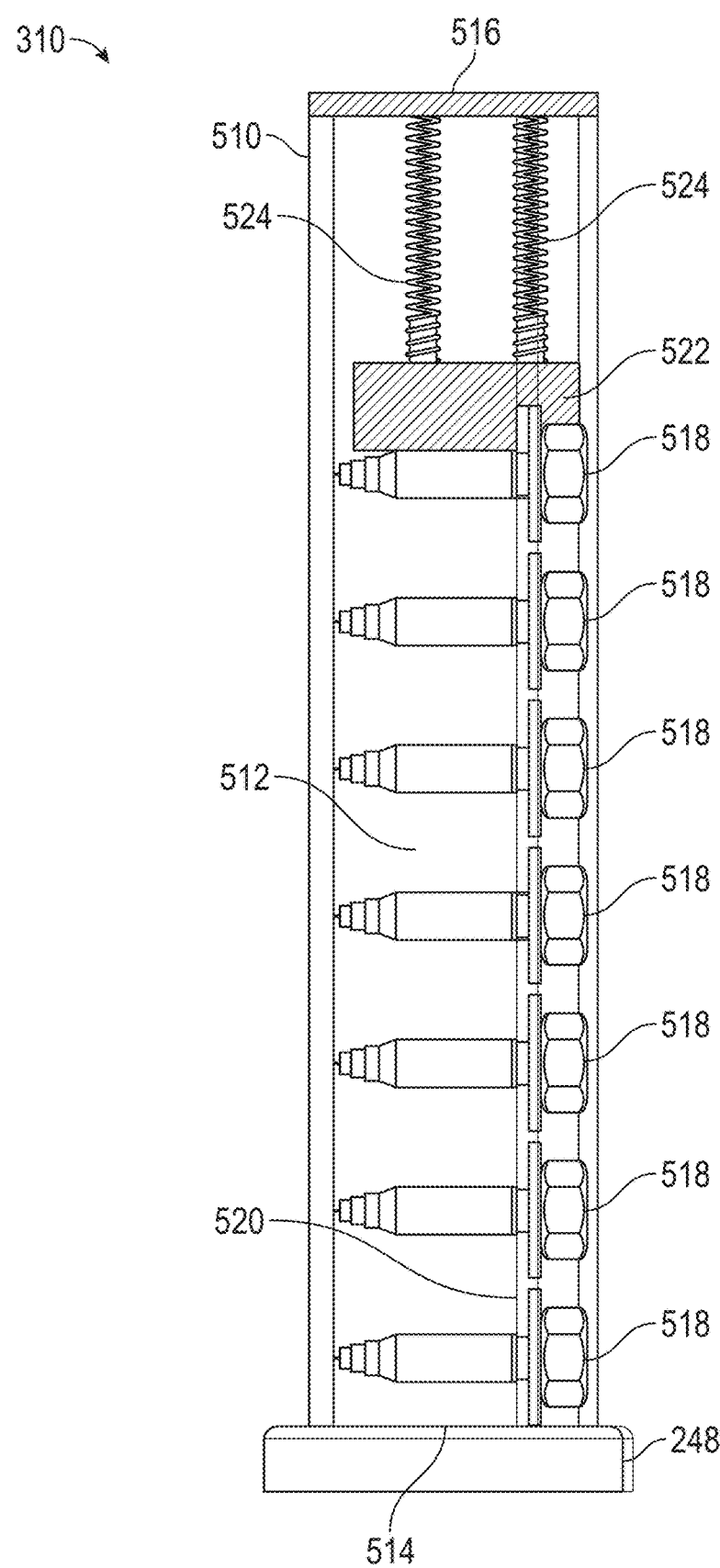
FIG. 5 is a cross-sectional view of a bolt dispensing magazine for use with the tool of FIGS. 1-3 in accordance with an example.

FIG. 5 is a cross-sectional view of the magazine 310 illustrating an internal cavity 512 thereof. The cavity 512 is defined by exterior walls of the magazine 310. As represented, a supply of bolts 518 may be stored within the cavity 512 and individually dispense from an opening at a first end 514 of the magazine 310 such that the bolts 518 enter the tools 214 via a magazine port 248. Alignment of the bolts 518 may be maintained within the cavity 512 with guide walls 520 disposed on the walls within the cavity 512. The bolts 518 may be biased toward the first end 514 from a second end 516 of the magazine 310 with a follower 522 and biasing members 524 (e.g., springs).

With reference now to FIG. 6 and with continued reference to FIGS. 1-5, a flowchart provides a method 600 for automated manufacturing in accordance with various examples. In some examples, the method 600 may be used to perform manufacturing tasks associated with assembly of the vehicle 110 as performed by the system 100. As can be appreciated in light of the disclosure, the order of operation within the method 600 is not limited to the sequential execution as illustrated in FIG. 6, but may be performed in one or more varying orders as applicable and in accordance with the present disclosure.

In one example, the method 600 may start at 610.

At 612, the method 600 may include locating, with a vision system, at least first and second portions of an article to be worked upon. For example, the method 600 may include locating three bolt holes at three locations on the vehicle 110 with the vision devices 124 of the vision system 122. The vision system 122 may then generate vision data indicative of the three locations and transmit the vision data to the controller 120.

At 614, the method 600 may include planning, with one or more processors of a controller, paths for positioning at least first and second tools of an end effector within working distances of the first and second portions of the article, respectively, based on the locations of the first and second portions as located by the vision system. For example, the method 600 may include processing the vision data and path planning software with the controller 120 to generate paths intended to position the working tip 232 of the first tool 214A over the first bolt hole at the first location, position the working tip 232 of the second tool 214B over the second bolt hole at the second location, and position the working tip 232 of the third tool 214C over the third bolt hole at the third location.

At 616, the method 600 may include articulating a robotic arm of an articulating robot based on the paths planned by the controller to position the end effector relative to the at least first and second portions of the article. For example, the method 600 may include moving the robotic arm 114 of the articulating robot 112 about one or more axes thereof to position the end effector 118 in a position relative to the vehicle 110 such that each of the tools 214 are capable of reaching their respective locations of the vehicle 110 upon which they will interact, that is, the first, second, and third bolt holes.

At 618, the method 600 may include operating the end effector based on the paths planned by the controller to independently position the first tool relative to the first portion of the article and position the second tool relative to the second portion of the article. Notably, various actions are described herein as being independent from each other which, as used herein, indicates the described actions may be performed regardless of other actions being performed simultaneously. For example, the method 600 may include independently extending or retracting a first tool arms 212 of the end effector 200 relative to the coupling device 210 using the frame rotary actuators 216, and simultaneously maintaining longitudinal positions of the other tool arms 212 or extending or retracting one or both of the other tool arms 212 by the same or different amounts. Similarly, the method 600 may include independently rotating one or more of the tool arms 212 relative to the coupling device 210 using the linear actuators 220, and independently rotating one or more of the tools 214 relative to each of the respective the tool arms 212 using the tool rotary actuators 226.

At 620, the method 600 may include performing at least a first manufacturing task on the first portion of the article with the first tool and a second manufacturing task on the second portion of the article with the second tool. For example, the method 600 may include operating the first tool 214A to fasten a first bolt in the first bolt hole, operating the second tool 214B to fasten a second bolt in the second bolt hole, and operating the third tool 214C to fasten a third bolt in the third bolt hole. Notably, the manufacturing tasks may be the same type of manufacturing tasks, or may be different types of manufacturing tasks. For example, the end effector may be used to simultaneously couple components together with a first type of fastener using a first tool, couple components together with a second type of fastener using a second tool, and weld one or more components with a third tool.

The method 600 may end at 622.

The systems and methods disclosed herein provide various benefits over certain existing systems and methods. For example, having multiple tools on the end effector that are capable of independently performing manufacturing tasks simultaneously significantly improves the efficiency of the manufacturing process relative to using existing single-tool end effectors. In some examples, one or more of the tools are configured to secure a fastener to the article being worked upon, and the tool(s) include a magazine configured to store and dispense a quantity of the fasteners. In such examples, the tool(s) may be capable of securing multiple fasteners in series significantly faster than existing tools that require the tool to be reloaded with another fastener between each manufacturing task. For example, certain existing tools are configured to pick up a first fastener, secure the first fastener in an article, and pick up a second fastener, secure the second fastener in the article, pick up a third fastener, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An end effector, comprising:
a coupling device configured to be functionally coupled to a robotic arm of an articulating robot;
first and second tool arms coupled to and extending from the coupling device, each of the first and second tool arms configured to independently and controllably extend and retract from the coupling device and configured to controllably rotate relative to the coupling device;
a first tool functionally coupled to the first tool arm and configured to independently perform a first manufacturing task, the first tool configured to controllably rotate relative to the first tool arm; and
a second tool functionally coupled to the second tool arm and configured to independently perform a second manufacturing task, the second tool configured to controllably rotate relative to the second tool arm,
wherein the end effector is configured to independently position the first tool relative to a first portion of an article and position the second tool relative to a second portion of the article while the robotic arm remains stationary, and to simultaneously perform the first manufacturing task on the first portion of the article with the first tool and the second manufacturing task on the second portion of the article with the second tool.

2. The end effector of claim 1, wherein the first tool is configured to install a fastener in a component and the first manufacturing task includes coupling two components with the fastener, wherein the second tool is a welding device, and the second manufacturing task includes welding one or more components.

3. The end effector of claim 1, wherein the first tool is configured to install a first type of fastener in the first portion of the article, wherein the second tool is configured to install a second type of fastener in the second portion of the article, wherein the first tool and the second tool each include a magazine configured to store and individually dispense a plurality of the first type of fastener or the second type of fastener.

4. The end effector of claim 1, wherein the first tool is a welding device, and the first manufacturing task includes welding one or more components, wherein the second tool is configured to deposit materials on the article.

5. The end effector of claim 1, further comprising:
a third tool arm coupled to and extending from the coupling device, the third tool arm configured to independently and controllably extend and retract from the coupling device and configured to controllably rotate relative to the coupling device; and
a third tool functionally coupled to the third tool arm and configured to independently perform a third manufacturing task, the third tool configured to controllably rotate relative to the third tool arm.

6. The end effector of claim 5, wherein two or more of the first manufacturing task, the second manufacturing task, and the third manufacturing task are different types of manufacturing tasks.

7. The end effector of claim 1, further comprising:

a first rotary actuator coupling the first tool arm to the coupling device and configured to rotate the first tool arm relative to the coupling device;

a second rotary actuator coupling the second tool arm to the coupling device and configured to rotate the second tool arm relative to the coupling device;

a first linear actuator configured to extend and retract the first tool arm relative to the coupling device;

a second linear actuator configured to extend and retract the second tool arm relative to the coupling device;

a third rotary actuator coupling the first tool to the first tool arm and configured to rotate the first tool relative to the first tool arm; and a fourth rotary actuator coupling the second tool to the second tool arm and configured to rotate the second tool relative to the second tool arm.

8. A system, comprising:

a vision system configured to locate first and second portions of an article to be worked upon and generate vision data indicative of the locations of the first and second portions;

an articulating robot having a robotic arm functionally coupled to and configured to controllably move an end effector, the end effector comprising:

a coupling device coupled to the robotic arm of the articulating robot;

a first tool arm functionally coupled to and extending from the coupling device;

a second tool arm functionally coupled to and extending from the coupling device;

a first tool functionally coupled to the first tool arm;

a second tool functionally coupled to the second tool arm;

a first rotary actuator coupling the first tool arm to the coupling device and configured to rotate the first tool arm relative to the coupling device;

a second rotary actuator coupling the second tool arm to the coupling device and configured to rotate the second tool arm relative to the coupling device;

a first linear actuator configured to extend and retract the first tool arm relative to the coupling device;

a second linear actuator configured to extend and retract the second tool arm relative to the coupling device;

a third rotary actuator coupling the first tool to the first tool arm and configured to rotate the first tool relative to the first tool arm; and a fourth rotary actuator coupling the second tool to the second tool arm and configured to rotate the second tool relative to the second tool arm; and a controller in operable communication with the vision system and the articulating robot, the controller configured to, by one or more processors:

receive the vision data from the vision system;

plan paths for positioning the first and second tools within working distances of the first and second portions of the article, respectively, based on the locations of the first and second portions in the vision data;

articulate the robotic arm of the articulating robot based on the planned paths to position the end effector relative to the first and second portions of the article;

operate the end effector based on the planned paths, while the robotic arm remains stationary, to independently position the first tool relative to the first portion of the article using one or more of the first rotary actuator, the first linear actuator, and the third rotary actuator and position the second tool relative to the second portion of the article using one or more of the second rotary actuator, the second linear actuator, and the fourth rotary actuator; and simultaneously perform a first manufacturing task on the first portion of the article with the first tool and a second manufacturing task on the second portion of the article with the second tool.

9. The system of claim 8, wherein the first tool is configured to install a fastener in a component and the first manufacturing task includes coupling two components with the fastener, wherein the second tool is a welding device, and the second manufacturing task includes welding one or more components.

10. The system of claim 8, wherein the first tool is configured to install a first type of fastener in the first portion of the article, wherein the second tool is configured to install a second type of fastener in the second portion of the article, wherein the first tool and the second tool each include a magazine configured to store and individually dispense a plurality of the first type of fastener or the second type of fastener.

11. The system of claim 8, wherein the first tool is a welding device, and the first manufacturing task includes welding one or more components, wherein the second tool is configured to deposit materials on the article.

12. The system of claim 8, wherein the end effector includes:

one or more additional tool arms each coupled to and extending from the coupling device, the one or more additional tool arms each configured to independently and controllably extend and retract from the coupling device and configured to independently and controllably rotate relative to the coupling device; and one or more additional tools each functionally coupled to a corresponding one of the one or more additional tool arms, each of the one or more additional tools configured to independently perform one or more additional manufacturing tasks, the one or more additional tools each configured to controllably rotate relative to the one or more additional tool arms coupled thereto.

13. The system of claim 12, wherein two or more of the first manufacturing task, the second manufacturing task, and the one or more additional manufacturing tasks are different types of manufacturing tasks.

14. A method, comprising:

locating, with a vision system, first and second portions of an article to be worked upon;

planning, with one or more processors of a controller, paths for positioning first and second tools of an end effector within working distances of the first and second portions of the article, respectively, based on the locations of the first and second portions as located by the vision system;

articulating a robotic arm of an articulating robot based on the paths planned by the controller to position the end effector relative to the first and second portions of the article;

operating the end effector based on the paths planned by the controller to independently position, while the robotic arm remains stationary, the first tool relative to the first portion of the article and position the second tool relative to the second portion of the article; and simultaneously performing a first manufacturing task on the first portion of the article with the first tool and a second manufacturing task on the second portion of the article with the second tool.

15. The method of claim 14, wherein operating the end effector to position the first and second tools includes, while the robotic arm remains stationary:

independently extending or retracting first and second tool arms of the end effector relative to a coupling device securing the end effector to the robotic arm of the articulating robot, wherein the first tool is coupled to the first tool arm and the second tool is coupled to the second tool arm;

independently rotating the first and second tool arms of the end effector relative to the coupling device; and independently rotating the first and second tools relative to the first and second tool arms of the end effector, respectively.

16. The method of claim 14, wherein the first manufacturing task includes coupling two components together with a fastener using the first tool, wherein the second manufacturing task includes coupling to components together via welding using the second tool.

17. The method of claim 14 further comprising installing a first type of fastener in the first portion of the article with the first tool, installing a second type of fastener in the second portion of the article with the second tool, dispensing the first type of fastener to the first tool from a first magazine configured to store and individually dispense a plurality of the first type of fastener, dispensing the second type of fastener to the second tool from a second magazine configured to store and individually dispense a plurality of the second type of fastener.

18. The method of claim 14, wherein the first manufacturing task includes welding one or more components, wherein the second manufacturing task includes depositing a material.

19. The method of claim 14, wherein the first manufacturing task and the second manufacturing task are the same type of manufacturing task.

20. The method of claim 14, wherein the first manufacturing task and the second manufacturing task are different types of manufacturing tasks.

\* \* \* \* \*